United States Patent
Moshyedi et al.

(10) Patent No.: US 12,149,453 B1
(45) Date of Patent: Nov. 19, 2024

(54) RESOURCE TOKENS FOR AUTHORIZATION OF RESOURCE ALLOCATION IDENTIFIED USING MACHINE LEARNING TECHNIQUES

(71) Applicant: Capital One Services, LLC, McLean, VA (US)

(72) Inventors: Anne Moshyedi, Washington, DC (US); Brian Nguyen, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/495,933

(22) Filed: Oct. 27, 2023

(51) Int. Cl.
*H04L 47/80* (2022.01)
*H04L 47/70* (2022.01)

(52) U.S. Cl.
CPC .......... *H04L 47/808* (2013.01); *H04L 47/826* (2013.01)

(58) Field of Classification Search
CPC .... H04L 47/826; H04L 47/808; G06Q 10/087
See application file for complete search history.

(56) References Cited

U.S. PATENT DOCUMENTS

2023/0196425 A1\* 6/2023 Sarin ................ G06Q 30/0635
705/26.1

FOREIGN PATENT DOCUMENTS

WO     WO-2005020018 A2 \*   3/2005  .......... G06Q 10/087

\* cited by examiner

*Primary Examiner* — Tonia L Dollinger
*Assistant Examiner* — Ishrat Rashid
(74) *Attorney, Agent, or Firm* — Foley & Lardner LLP

(57) ABSTRACT

Methods and systems are described herein for a component allocation system for temporarily allocating components via resource tokens. The component allocation system may receive a request for components that match a set of user-defined criteria. The component allocation system can determine, based on the set of user-defined criteria, components that satisfy the set of user-defined criteria. Responsive to receiving a user selection of a first and second component from the determined components, the system may input component data for each of the first and second components into a machine learning model, where the machine learning model is trained to determine whether two components are interchangeable. Responsive to obtaining the indication that the first and second component are interchangeable, the system may generate a resource token indicating temporary transfer of the first and second component to a user.

20 Claims, 7 Drawing Sheets

310

Inventory 300

| | |
|---|---|
| Item 1 | <"screw", 38, 33, "4"> |
| Item 2 | <"screw", 8, 33, "4"> |
| Item 3 | <"screw", 32, 33, "4"> |
| Item 4 | <"screw", 33, 33, "4"> |
| Item 5 | <"wire", 49, "stranded"> |
| Item 6 | <"wire", 44, "solid"> |
| Item 7 | <"wire", "solid core"> |
| Item 8 | <"wire", 32, "solid"> |

Resource Token 500

| User identifier 502 | <"Mark G.", "markg@sales.com"...> |
| --- | --- |
| First identifier 504 | <Serial Number: "5345664"> |
| Second Identifier 506 | <Serial Number: "0064114"> |
| Time Limit 508 | <Days: 30> |

FIG. 5

RESOURCE TOKENS FOR AUTHORIZATION OF RESOURCE ALLOCATION IDENTIFIED USING MACHINE LEARNING TECHNIQUES

SUMMARY

In many industries such as construction, filming, and others, equipment is often obtained through a centralized tool management system that may be responsible for tracking, issuing, and receiving the equipment used by various users. For example, many studios have high-end equipment such as high-resolution cameras, professional-grade lenses, specialized lighting equipment, audio gear, high-fidelity speakers, etc. that can be borrowed for varying durations for different projects. Hospitals have surgical instrument rooms that hold a wide range of equipment used by medical professionals during surgical procedures. Similarly, in construction, users may place requests for tools (e.g., using a tool management system) and based on a user's clearance level and/or tool availability, a tool may be issued with a return date for when a tool should be returned (e.g., at the end of a project or end of a specific task).

In some cases, for example, where high-cost or high-risk tools are used, access may be limited based on necessity in order to prevent unwanted risk to users, damage, misuse, and/or the like. Users may only be cleared to borrow one type of tool for a specific task or for the duration of the project. However, it may be difficult for operators of the equipment to determine in the first instance which tool might be the optimal tool for a project. For example, different tools may excel in specific conditions, materials, or environments, and until a user encounters these variables on the job, they may not fully comprehend which tool performs better under varying circumstances. Similarly, new tools with innovative features are continuously introduced, and users may not know prior to trying out new tools whether those tools are appropriate for a project.

It may be cumbersome or impossible for users to iteratively repeat the process to try out and compare tools one at a time, as doing so may require the user to create multiple requests, obtain multiple issuances, and make multiple returns. Further, it is more efficient to perform a comparative evaluation of two tools or equipment concurrently rather than sequentially. For example, a direct side-by-side comparison may allow for a more direct assessment of the features, performance, and suitability of the equipment for the task or application. By analyzing multiple tools in parallel, may reduce the time required for evaluation. However, at the same time, if multiple tools are borrowed by a user for the same purpose and only one is being used, it may make such tools inaccessible to others who need the tools to perform operations as part of their projects. As such, it is important to minimize the time each tool is unused and idle while in a borrowed state.

Accordingly, a mechanism is desired that would enable temporary allocation of interchangeable components (e.g., equipment), that, for example, minimizes the time tools are borrowed and unused but enables users to try out various components. For example, a system may generate a token for temporary transfer for two interchangeable components (e.g., used for the same or similar purpose) contingent on the premise that one of the components will be returned within a shorter time frame while the other of the components may be used by the user over a longer period, e.g., for the duration of a project, without specifying which of the components will be kept for a longer period of time or, in some examples, permanently.

However, there are many difficulties with doing so. For example, it is difficult to determine whether components are similar enough to be considered interchangeable. Therefore, methods and systems are described that enable temporary or permanent allocation of components (e.g., using machine learning) to determine whether components are interchangeable. One mechanism for enable temporary allocation of interchangeable components utilizes machine learning techniques. For example, machine learning techniques may be used to determine whether two components are interchangeable, and responsive to determining that two components are interchangeable, generate a resource token indicating temporary transfer of the components. The resource token may be used for tracking the components. A component allocation system may be used to perform operations described herein.

The component allocation system may receive a request for components that match a set of user-defined criteria. For example, a surgeon performing a medical procedure necessitating cannulas (e.g., for delivering fluids, etc.) but may not know the specific size needed prior to the procedure. The surgeon may specify criteria for the cannula, such as a cannula ranging from 14-17 gauge (G). The component allocation system may determine components that satisfy the criteria, such as from within an inventory of components. For example, the component allocation system may determine 20-30 cannula in stock in the surgical instrument room of the specified size range. The inventory of components may include a list of components and metadata identifying a corresponding set of specifications for each component.

The user may select a plurality of components from the inventory components. For example, the surgeon may identify and select two or more specific cannulas from the identified components. Responsive to receiving a user selection of a first and second components, the component allocation system may input, into a machine learning model, component data for the first and second components to obtain an indication whether the first component and the second component are interchangeable. For example, the component allocation system may input, for each component, a description of the component and one or more images associated with the component into one or more machine learning models. The one or more machine learning models may be able to identify, e.g., using natural language processing or computer vision techniques, whether two components are interchangeable. For example, the component allocation system may identify that the selected cannulas are interchangeable (e.g., similar for most applications, etc.).

Responsive to obtaining the indication that the selected components are interchangeable, the component allocation system may generate a resource token indicating temporary transfer of the first and second components (e.g., selected components) to a user (e.g., when a surgeon checks out the components, a producer checks out multiple cameras, etc.). The resource token may include (1) user identification data of a user, (2) a first entry corresponding to a first identifier of the first component, (3) a second entry corresponding to a second identifier of the second component, and/or (4) a time limit representing a time after which the temporary transfer becomes a permanent transfer.

When the token is generated, the component allocation system may notify the user of the component acquisition. In particular, the component allocation system may transmit an indication of the resource token to the remote device. For example, the user, at the user's device, may receive a confirmation that the selected components have been checked out to the user. The component allocation system may use the token to keep track of components and to whom the components have been temporarily allocated to. When one of the components are returned, component allocation system may update the token, e.g., to deactivate the token. In other cases, where a user fails to return at least one of the components within the time limit indicated by the token, the component allocation system may use the information to charge the user a late fee, etc.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an exemplary data structure of an inventory of components, in accordance with one or more embodiments of this disclosure.

FIG. 5 illustrates an exemplary resource token indicating temporary transfer of components to a user, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
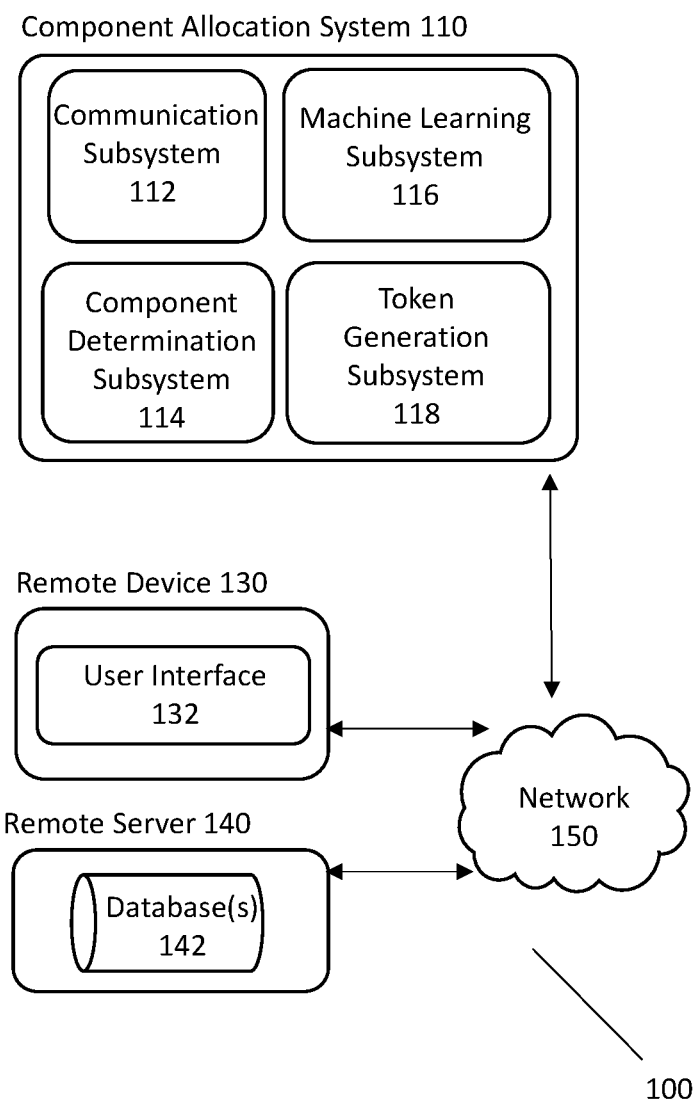
FIG. 1 shows an illustrative system for temporarily allocating components via resource tokens, in accordance with one or more embodiments of this disclosure.

Environment 100 of FIG. 1 is an example system that may be used to temporarily allocate components via resource tokens e.g., such that tool utilization is optimized by reducing idle durations while enabling users to evaluate various components. Environment 100 includes component allocation system 110, remote device 130, and remote server 140. Component allocation system 110 may execute instructions to for temporarily allocating components via resource tokens, e.g., which may be used to track a user's possession of the component. The resource tokens allow for users to temporarily or permanently transfer multiple interchangeable components, e.g., where at least one of the interchangeable components is to be transferred back within a time limit.

Component allocation system 110 may include software, hardware, or a combination of the two. For example, component allocation system 110 may be a physical server or a virtual server that is running on a physical computer system. In some embodiments, component allocation system 110 may be configured on a user device (e.g., a laptop computer, a smart phone, a desktop computer, an electronic tablet, or another suitable user device).

When a user requires a component such as a tool from a facility or warehouse for completing a project (e.g., a construction project, a medical procedure, a photoshoot, etc.), the user may request components from the inventory that are specific to the user's needs. Alternatively or additionally, a user may query or search (e.g., request) for one or more components that meet a search criteria, e.g., from an online merchant via a browser in order to purchase the components. In some examples, the user may request the components via a user interface 132 at a remote device 130 (e.g., mobile phone, computer, smart device, etc.) in connection with the component allocation system 110 via network 150 and/or communication subsystem 112 of the component allocation system. Communication subsystem 112 may include software components, hardware components, or a combination of both and may be used to interface and transmit/receive information from remote device 130 or remote server 140. Communication subsystem 112 may include a network card (e.g., a wireless network card and/or a wired network card) that is associated with software to drive the card.

Figure 2:
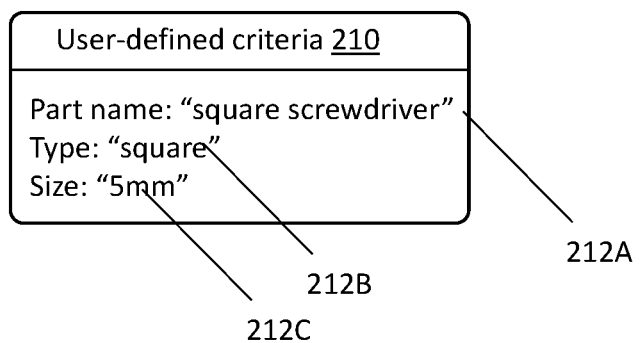
FIG. 2 illustrates an exemplary data structure of a request for components that match a set of user-defined criteria, in accordance with one or more embodiments of this disclosure.

The user may use input methods such as keyboard input, mouse clicks, touch input, gesture recognition, and/or voice command to request components via the remote device 130. The request may include a set of user-defined criteria specifying the type of components the user needs. For example, the user may specify and the component allocation system may receive features of the components such as size, type, purpose, etc. For example, FIG. 2 illustrates an exemplary data structure of a request 200 for components that match a set of user-defined criteria. In the example of FIG. 2, the request includes user-defined criteria 210 which indicates an identifier 212A of the component (e.g., "square screwdriver"), a type 212B of the component (e.g., "blue"), and a size 212C of the component (e.g., "5 mm").

The component allocation system 110 may be used to track, issue, and receive components used by various users, e.g., from a facility or warehouse of components. In order to do so, component allocation system 110 may use an inventory of components to keep track of the available components and monitor their status such that when a user requests components. The component allocation system may utilize at least a portion of the inventory to identify appropriate components (e.g., that are available and suitable). An inventory of components may include a list of components stored at a physical location (e.g., the facility or warehouse) and metadata for each component.

For example, FIG. 3 illustrates an exemplary data structure of an inventory of components 300, in accordance with one or more embodiments of this disclosure. The inventory of components 300 may include a list of components identifying one or more components such as component 310 and component 330. The inventory of components 300 may also include metadata identifying a corresponding set of specifications for each component. In the example of FIG. 3, the inventory includes component 310 having specifications 320, which indicate that the component is labeled as "screw" having features identified by 38, 33 and "4," such as dimensions, color, head style, drive type, thread diameter, thread count, material, etc. Similarly, component 230 may have specifications 240 which identify the component as a "wire" and identify other features of the component. According to some examples, the inventory of components may also identify a corresponding primary custodian associated with each component. A primary custodian may be for example, a merchant or owner of the component, or the owner of the facility storing the component. The primary custodian of each component may provide information regarding the component, e.g., to be stored at the inventory of components. For example, the component allocation system may receive, from a different primary custodian associated with the different component, a description of a component and/or one or more first images associated with the first component. The inventory may also include data regarding whether a component is being used, and to whom the component is issued at a current time.

Component allocation system 110 may access the inventory of components in a variety of ways. For example, component allocation system 110 may include the inventory of components locally (e.g., on local storage), and the inventory of components may be stored in data structures (e.g., arrays, linked list, dictionaries, binary trees, etc.) in one or more files. In local storage, the inventory may be accessed via low-level operations by the component allocation system. Alternatively or additionally, the component allocation system 110 may access the inventory of components from a remote server, such as remote server 140. For example, the inventory of components may be stored in data structures (e.g., tables) at database(s) 142. The inventory of components may be accessed from the remote server 140, e.g., upon request, via communication subsystem 112 of component allocation system 110 via network 150, where network 150 may include a local area network, a wide area network (e.g., the Internet), or a combination of the two.

As described, communication subsystem 112 may pass at least a portion of the data of the request for components by the user and/or the inventory of components, or a pointer to the data in memory, to component determination subsystem 114. The component determination subsystem 114 may be configured to determine components from the inventory of components (e.g., inventory of components 300) that satisfy the set of user-defined criteria (e.g., user-defined criteria 210) from the received request (e.g., request 200). The component determination subsystem 114 may use the data passed from the communication subsystem representing the inventory of components and may use the specifications for each component of the inventory of components to determine whether each component satisfies the user-defined criteria.

Component determination subsystem 114 may perform a variety of operations to determine components from the inventory that satisfy the set of user-defined criteria. For example, component determination subsystem 114 may perform querying and data filtering processes to identify suitable components. In one example, component determination subsystem 114 may use a query language to request data from the inventory that adhere to one or more user-defined criteria. After querying, the subsystem may apply additional filters or sort the results based on user preferences or requirements by the component allocation system. In some examples, the subsystem may allow for fuzzy searches that allow for some minor errors or variations in the search term. In the example where the component allocation system receives a user's query or search (e.g., request) for one or more components that meet a search criteria from an online merchant via a browser in order to purchase the components, the component allocation system may first parse the query, e.g., to identify the criteria based on parts of the query.

Once the components that satisfy the user-defined criteria have been identified, the component allocation system may present the textual and/or visual representations of components that satisfy the user-defined criteria to the user requesting the components, e.g., so that the user may select one or more components to use (e.g., check out, transfer to themselves). For example, the component determination subsystem 114 may pass at least a portion of data corresponding to components that satisfy the user-defined criteria to communication subsystem 112. Communication subsystem 112 may transmit the data to remote device 130, where the one or more components that satisfy the user-defined criteria may be presented to the user for user selection. The user may select components to use, e.g., via user interface 132. In some examples, the user may select a first and second components for temporary transfer, e.g., such that the user may temporarily test out a pair of components with the intention of returning one of the components and maintaining possession of the other for the duration of the project or permanently. For example, responsive to a user's query for components from an online merchant, the component allocation system may be configured to display, via the browser, the one or more components that satisfy the user-defined criteria. The user may add to a cart of an online browser, the components (e.g., an item, a tool, a part, etc.) that a user intends to purchase.

Responsive to receiving a user selection of a first component and a second component, e.g., via communication subsystem 112 and network 150, communication subsystem 112 may pass data indicating the first and second components (e.g., component identifiers) to machine learning subsystem 116. The machine learning subsystem may be configured to determine whether the first and second component are interchangeable. As described herein, especially where high-cost or high-risk tools are borrowed, users may only be cleared to borrow one type of tool for a specific task or for the duration of the project. As such, the component allocation system may identify whether components selected by the user are interchangeable prior to (or in parallel with) generating a resource token for temporary transfer of both. As referred to herein, the term "interchangeable" may refer to two components being able to be used for a similar or same purpose, having a same or similar price, having similar features.

Similarly, in the example where a user is selecting items to purchase from an online merchant or retailer via a browser, the user may want to try out two or more items, with the intention of returning one of the items. However, it may be desirable not to force a user to pay for the cost of the two or more items. For example, the user may want to try out two different vacuum cleaners having the same cost and design, but different brands. The user may not want to pay out of pocket the cost of the two different vacuum cleaners at a given time, only to return one and receive a refund for the returned product. Instead, the component allocation system may be used to identify interchangeable components at checkout, such that the user is charged only once and given until the expiration of a time limit to return one of the two items.

Machine learning subsystem 116 may include one or more different machine learning models trained to determine whether two components are interchangeable. For example, machine learning subsystem 116 may input component data associated with each of the selected components into a machine learning model to obtain an indication whether the first component and the second component are interchangeable. The machine learning model may analyze a variety of factors, such as a price, similarity or distance metrics between a description or item name of each, similarity of photos for the components, etc. Machine learning subsystem 116 may utilize a combination of computer vision or natural language processing (NLP) techniques to determine whether components are interchangeable. For example, the component data of each of the selected components may include a description and one or more images of each component (e.g., obtained from an inventory of the components). The model may employ NLP algorithms to extract and analyze features from the textual descriptions of components and may identify key attributes such as material properties, dimensions, function, etc. The model may generate a similarity or distance measurement between the textual descriptions or the identified key attributes and determine, based on whether the similarity or distance measurement exceeds a threshold, whether or not the components are interchangeable. Similarly, the model may include techniques specialized for image data, such as convolutional neural networks (CNNs) to process images of the components. The model can capture and compare patterns, shapes and configurations of each of the first and second components and based on a similarity between identified patterns, shapes, and/or configurations between the images of the first and second component, determine that the components are interchangeable. Furthermore, the machine learning model may be trained using datasets of components to enable the machine learning model to identify interchangeable components. Example machine learning models of machine learning subsystem 116 are described in relation with FIG. 4.

According to some examples, machine learning subsystem 116 may include a plurality of machine learning models. Based on the component types of the selected components, machine learning subsystem 116 may select one or more specific machine learning models from a plurality of machine learning models. Each machine learning model may be tailored for specific input types or modalities. For example, different machine learning models may be trained depending on different component types to identify whether components are interchangeable. Doing so may yield higher accuracy and better performance over a single machine learning model as each model may have parameters specific to the type of component. Further, running generalized models may be computationally expensive, and it is often more computationally efficient to run specialized models. For example, if the component type is a book, a first machine learning model may exhibit a higher dependency on textual features for its computations and predictions, rather than on visual factors. However, if the component type is a painting or a print, a second machine learning model of the plurality of machine learning models may depend more on computer vision techniques and visual cues.

As such, machine learning subsystem 116 may dynamically select a machine learning model to use based on a determined component type, in order to obtain a more accurate classification. For example, machine learning subsystem 116 may determine a component type from a plurality of component types based on the user selection of the first component and the second component. Machine learning subsystem 116 may then select, based on the component type, the suitable machine learning model from a plurality of machine learning models. The suitable machine learning model may be used to determine whether the components are interchangeable.

Figure 4:
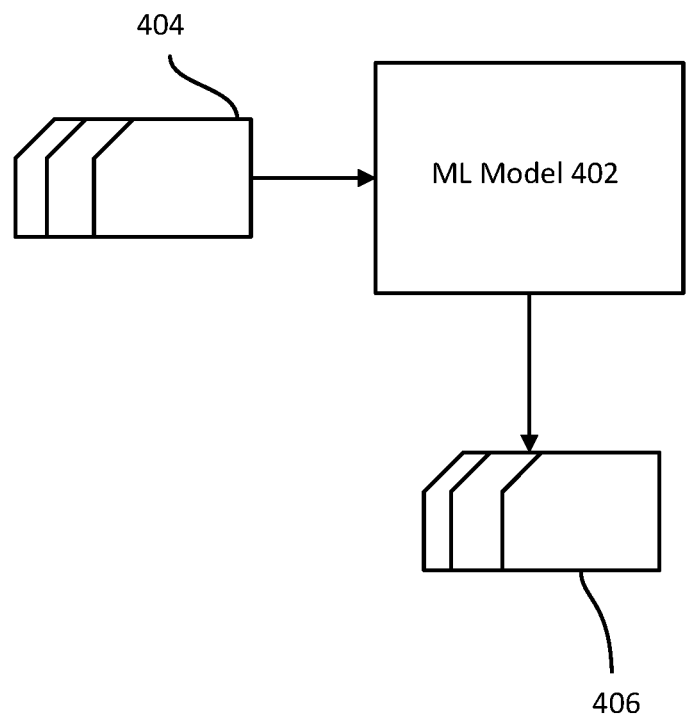
FIG. 4 illustrates an exemplary machine learning model, in accordance with one or more embodiments of this disclosure.

For example, FIG. 4 illustrates an exemplary machine learning model that may be used by machine learning subsystem 116 to determine whether two components (e.g., the user selected components) are interchangeable. For example, component allocation system 110 may be configured to input data such as component data associated with each of the first and second components into machine learning model 402 and obtain an indication of interchangeability of the components as an output.

The machine learning model may be trained to determine whether two components are interchangeable. In some examples, machine learning subsystem 116 may train machine learning model 402 using a variety of data in different formats. For example, the machine learning subsystem 116 may access a plurality of entries each associated with a corresponding component such as from database(s) 142 of remote server 140. The plurality of entries may be of different (e.g., non-standardized) formats. The machine learning subsystem 116 may transform the plurality of entries into a standardized dataset, such that each entry of the standardized dataset is associated with a corresponding component and may include (1) a corresponding textual description. (2) one or more corresponding images, and/or (3) one or more identifiers identifying interchangeable components. The machine learning subsystem 116 may then train the machine learning model 402 using the standardized dataset to obtain one or more model parameter values for the machine learning model.

As described herein, the machine learning subsystem 116 may include a plurality of machine learning models (e.g., machine learning model 402). Each machine learning model may correspond to a different component type. The different machine learning models of machine learning subsystem 116 may be trained using different datasets that include representations of components specific to a component type. The component allocation system may access, from a remote server, a plurality of datasets each including data specific to a corresponding component type and train each of a plurality of machine learning models using a dataset specific to a corresponding component type. The machine learning subsystem 116 may obtain one or more model parameter values as a result of the training.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

As described herein, machine learning subsystem 116 may pass an indication of whether the first and second component are interchangeable, or pass a pointer to the data in memory, to token generation subsystem 118. Responsive to obtaining an indication that the first and second components are interchangeable, the token generation subsystem 118 may be configured to generate a resource token indicating temporary transfer of the first component and the second component to a user. The resource token may be used by the system to maintain status information regarding a temporary transfer and may indicate the temporary transfer of the first component and the second component from a corresponding primary custodian (e.g., manufacturer, merchant, owner of storage facilities etc.) to the user.

The resource token may include user identification data of a user, a first entry corresponding to a first identifier of the first component, a second entry corresponding to a second identifier of the second component, and a time limit representing a time after which the temporary transfer becomes a permanent transfer (e.g., the user can no longer return the component or must effectively purchase the component). For example. FIG. 5 illustrates an exemplary resource token 500 indicating temporary transfer of components to a user, in accordance with one or more embodiments of this disclosure. In the example of FIG. 5, the token may identify a user to whom the components have been transferred using user identifier 502. The token may also include a first identifier 504 and a second identifier 506 that identifies the first and second component that are temporarily transferred to the user. Although resource token 500 is illustrated with two identifiers, resource token 500 may have three or more identifiers as well.

As described herein, the token may indicate temporary transfer for two interchangeable components contingent on the premise that one of the components will be returned within a shorter time frame while the other of the components may be used by the user over a longer period, e.g., for the duration of a project, without specifying which of the components will be kept for a longer period or, in some examples, permanently. The token may include a time limit 508 indicating the amount of time a user is enabled to have temporary custody or possession of the components before the user must return at least one of the two components. In some embodiments, the value for the time limit may be based on a type of component. For example, more expensive or high-clearance components may have a shorter time limit, e.g., to promote accessibility to the components not in use by the user. In some examples, the time limit may indicate a time after which the temporary transfer becomes a permanent transfer. Once the token is successfully generated, the component allocation system may transmit an indication of the resource token to the remote device (e.g., via communication subsystem 112 and/or network 150). In one example, when a token is generated for a user purchasing goods from an online retailer or merchant, the component allocation system may transmit the indication of the resource token to a device of the online retailer or merchant, who may subsequently initially charge the user for the cost of one of the components, but not the other component. The cost of the other component may be charged based on an expiration of the time limit without a return of either of the components, as described herein.

The resource token may also be used in a process for sending reminders to the user or may be used by primary custodians of the components to charge the user late fees or for the cost of the component if the components are not returned. For example, once the component allocation system generates the resource token and based on events (e.g., the return of a component, the expiration of a time limit), the component allocation system may update one or more flags causing visibility of the resource token to the primary custodians corresponding to the components. The resource tokens may be made visible, if for example, the component was not returned within the time limit. Once made visible to the primary custodian, the primary custodian may charge the user, e.g., by charging an account associated with the user identifier. Alternatively or additionally, the resource tokens may be made non-visible to the primary custodian responsive to a return of a component prior to the expiration of the time limit.

When the component allocation system receives (e.g., via communication subsystem 112 and/or network 150), from the remote device, an indication that either the first component or the second component has been transferred from the user to the corresponding primary custodian (e.g., returned), the component allocation system may deactivate the resource token. For example, the indication may include identifiers (e.g., user identifier, first identifier, second identifier) for identifying the user and/or the components. Deactivating the resource token may mean deleting the resource token. For example, the resource token may include a flag (e.g., a permanently hidden flag) representing visibility of the resource token by the remote device, and deactivating the resource token may include modifying a value of the flag so that the resource token is permanently hidden, e.g., to the primary custodian of each of the components.

When a time limit has been exceeded and no indication that either component has been transferred from the user to the corresponding primary custodian, e.g., a user kept both components for past the time limit, both components may be considered permanently transferred to the user, e.g., transferred for the duration of a project or giving the user permanent ownership of the components. As such, token generation subsystem 118 may generate a first component resource token and a second component resource token, wherein the first component resource token comprises user identification data and the first identifier of the first component, and wherein the second component resource token comprises the user identification data and the second identifier of the second component. The component allocation system may then transmit to the remote device (e.g., via network 150 and/or communication subsystem 112), a notification comprising (1) an indication that the time limit is exceeded and (2) an indication of successful generation of the first component resource token and the second component resource token.

Furthermore, a value of a flag (e.g., temporarily hidden flag) of the token may be updated (e.g., to a value of false) such that the resource token is visible to the primary custodian. The primary custodian may use the unique identifier to identify the user. The user may be charged for the price of the non-returned items.

According to some examples, the user may indicate that the two components are not in fact interchangeable (e.g., the machine learning subsystem 116 predicted inaccurately that the components are interchangeable). The user at the remote device may indicate to the component allocation system that the selected components are not interchangeable and that the user would like to request permanent transfer of both. The component allocation system may receive, from the remote device, a user input indicating that the components are not interchangeable and may train the machine learning model using (1) the input, (2) the first component data associated with the first component and (3) the second component data associated with the second component to obtain an updated machine learning model. The one or more model parameters of the updated machine learning model may be stored, e.g., locally or on the remote server 140.

Computing Environment

Figure 6:
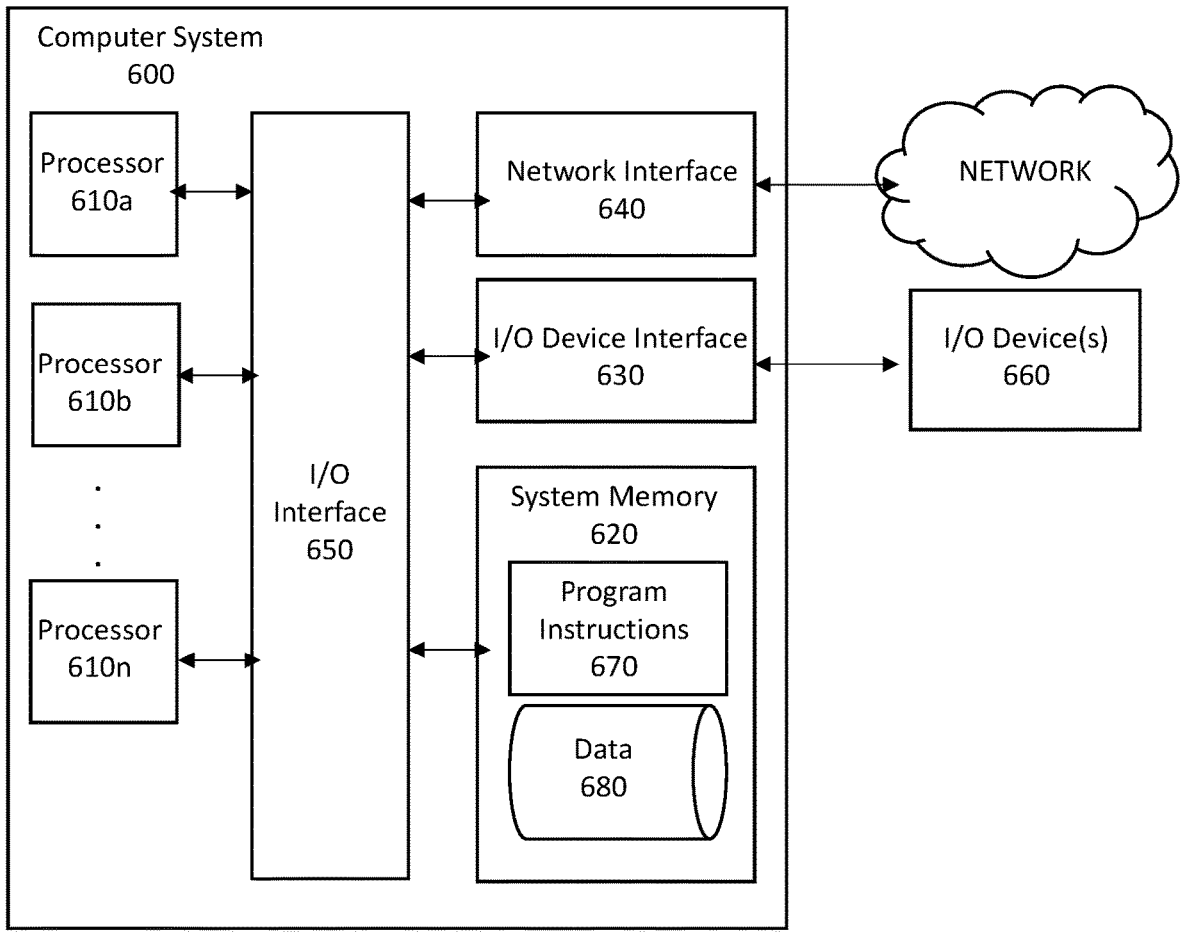
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
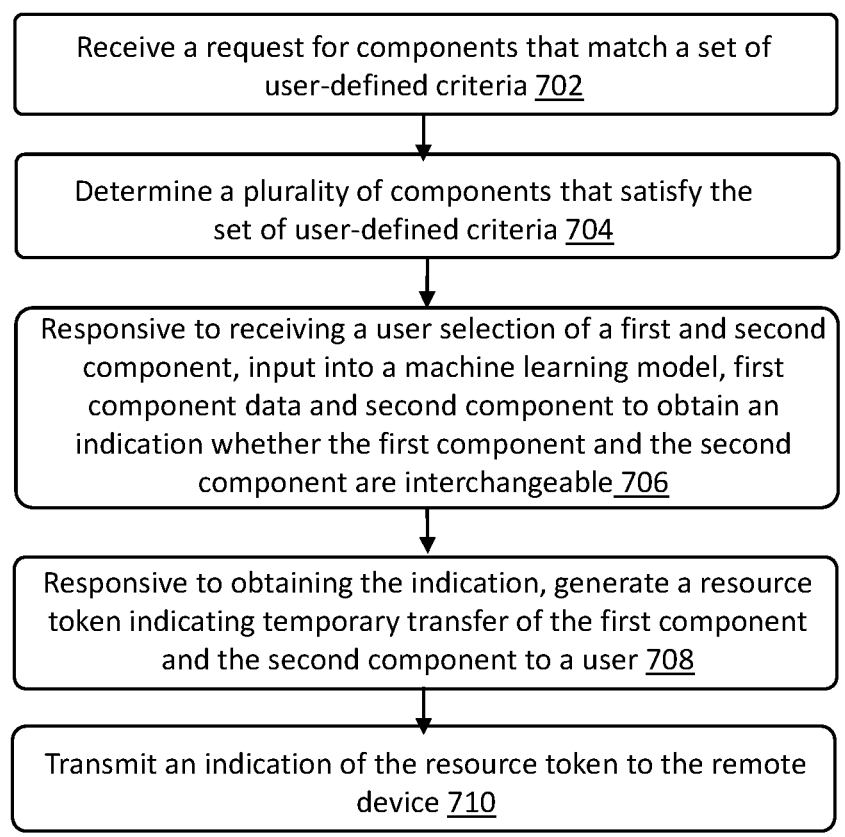
FIG. 7 is a flowchart of operations for temporarily allocating components via resource tokens, in accordance with one or more embodiments of this disclosure.

FIG. 7 is a flowchart of operations for temporarily allocating components via resource tokens, in accordance with one or more embodiments of this disclosure. The operations of FIG. 7 may use components described in relation to FIG. 6. In some embodiments, Component allocation system 110 may include one or more components of computer system 600. At 702, component allocation system 110 receives a request for components that match a set of user-defined criteria. Component allocation system 110 may receive the request over network 150 using network interface 640. For example, when a user requires a component, the user may request for components from the inventory that are specific to their needs. Alternatively or additionally, a user may query or search (e.g., request) for one or more components that meet a search criteria, e.g., from an online merchant via a browser in order to purchase the components.

At 704, component allocation system 110 determines a plurality of components that satisfy the set of user-defined criteria. Component allocation system 110 may use one or more processors 610a, 610b, and/or 610n to perform the determination. For example, the system may perform a variety of operations to determine components from the inventory that satisfy the set of user-defined criteria such as performing querying and data filtering processes to identify suitable components. In one example, a query language may be used to request data from the inventory that adhere to one or more user-defined criteria. After querying, the subsystem may apply additional filters or sort the results based on user preferences or requirements by the system.

At 706, responsive to receiving a user selection of a first and second component, component allocation system 110 input into a machine learning model, first component data and second component to obtain an indication whether the first component and the second component are interchangeable. For example, the system may input component data associated with each of the selected components into a machine learning model to obtain an indication whether the first component and the second component are interchangeable. For example, the component data of each of the selected components may include a description and one or more images of each component (e.g., obtained from an inventory of the components). The machine learning model may consider a variety of factors, such as a price, similarity or distance metrics between a description or item name of each, similarity of photos for the components, etc. The system may utilize a combination of computer vision or natural language processing (NLP) techniques to determine whether components are interchangeable.

Responsive to obtaining the indication, the system generates a resource token indicating temporary transfer of the first component and the second component to a user at 708.

For example, component allocation system 110 may use one or more processors 610a-610n to perform the operations and may store the results in system memory 620. The resource token may include user identification data of a user, a first entry corresponding to a first identifier of the first component, a second entry corresponding to a second identifier of the second component, and a time limit representing a time after which the temporary transfer becomes a permanent transfer (e.g., the user can no longer return the component or must effectively purchase the component). The resource token may be used to send reminders to the user or may be used by primary custodians of the components to charge the user late fees or for the cost of the component if the components are not returned.

At 710, the component allocation system 110 transmits an indication of the resource token to the remote device. Component allocation system 110 may transmit the indication over network 150 using network interface 640. In one example, when a token is generated for a user purchasing goods from an online retailer or merchant, the system may transmit the indication of the resource token to a device of the online retailer or merchant, who may subsequently initially charge the user for the cost of one of the components, but not the other component. The cost of the other component may be charged based on an expiration of the time limit without a return of either of the components, as described herein.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a remote device, a request for components that match a set of user-defined criteria, wherein the request comprises the set of user-defined criteria; determining, within an inventory of components and based on the set of user-defined criteria, a plurality of components that satisfy the set of user-defined criteria, wherein the inventory of components comprises a list of components and metadata identifying a corresponding set of specifications for each component; responsive to receiving a user selection of a first component and a second component from the plurality of components of the inventory of components, inputting into a machine learning model, first component data associated with the first component and second component data associated with the second component to obtain an indication whether the first component and the second component are interchangeable, wherein the machine learning model is trained to determine whether two components are interchangeable; responsive to obtaining the indication that the first component and the second component are interchangeable, generating a resource token indicating temporary transfer of the first component and the second component to a user, wherein the resource token comprises (1) user identification data of a user, (2) a first entry corresponding to a first identifier of the first component, (3) a second entry corresponding to a second identifier of the second component, and (4) a time limit representing a time after which the temporary transfer becomes a permanent transfer, and transmitting an indication of the resource token to the remote device.
2. Any of the preceding embodiments, wherein the first component data comprises a first description of the first component and one or more first images associated with the first component and the second component data comprises a second description of the second component and one or more second images associated with the second component.
3. Any of the preceding embodiments, further comprising, receiving, from a first primary custodian associated with the first component. (1) the first description of the first component and (2) one or more first images associated with the first component; receiving, from a second primary custodian associated with the first component. (1) the second description of the second component and (2) one or more second images associated with the second component; and determining, based on a component type of the first component and second component, a value for the time limit.
4. Any of the preceding embodiments, wherein each component is associated with a corresponding primary custodian and generating the resource token comprises indicating the temporary transfer of the first component and the second component from the corresponding primary custodian.
5. Any of the proceeding embodiments, further comprising: receiving, from the remote device, an indication that either the first component or the second component has been transferred from the user to the corresponding primary custodian; and responsive to receiving the indication, deactivating the resource token.
6. Any of the preceding embodiments, wherein the resource token further comprises a flag representing visibility of the resource token by the remote device, and wherein deactivating the resource token comprises modifying a value of the flag.
7. Any of the preceding embodiments, further comprising: responsive to a determination that the time limit is exceeded, generating a first component resource token and a second component resource token, wherein the first component resource token comprises user identification data and the first identifier of the first component, and wherein the second component resource token comprises the user identification data and the second identifier of the second component; and transmitting, to the remote device a notification comprising (1) an indication that the time limit is exceeded and (2) an indication of successful generation of the first component resource token and the second component resource token.

8. Any of the preceding embodiments, further comprising: receiving, from the remote device, an input indicating that the first component and the second component are not interchangeable; training the machine learning model using (1) the input, (2) the first component data associated with the first component and (3) the second component data associated with the second component to obtain an updated machine learning model; and storing one or more model parameters of the updated machine learning model.

9. Any of the preceding embodiments, further comprising: accessing, from a remote server, data including a plurality of entries each associated with a corresponding component; transforming the plurality of entries into a standardized dataset, wherein each entry of the standardized dataset is associated with a corresponding component and comprises (1) a corresponding textual description, (2) one or more corresponding images, and (3) one or more identifiers identifying interchangeable components; and training the machine learning model using the standardized dataset to obtain one or more model parameter values for the machine learning model.

10. Any of the preceding embodiments, further comprising: accessing, from a remote server, a plurality of datasets each comprising data specific to a corresponding component type; and training each of a plurality of machine learning models using a dataset specific to a corresponding component type, wherein each machine learning model is trained to determine whether two components of a component type are interchangeable to obtain one or more model parameter values for the machine learning model.

11. Any of the preceding embodiments, further comprising: determining a component type from a plurality of component types based on the user selection of the first component and the second component; selecting, using the component type, the machine learning model from a plurality of machine learning models, wherein the machine learning model is trained to determine whether two components of the component type are interchangeable; and accessing, from a remote server, one or more model parameter values corresponding to the machine learning model.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for temporarily allocating components via resource tokens, the system comprising:
one or more processors; and
a non-transitory, computer readable medium comprising instructions that, when executed by the one or more processors, causes operations comprising:
accessing an inventory of components, wherein the inventory of components comprises a list of components, a corresponding primary custodian associated with each component and metadata identifying a corresponding set of specifications for each component;
receiving, from a remote device, a request for components that match a set of user-defined criteria, wherein the request comprises (1) the set of user-defined criteria and (2) user identification data;
determining, based on the set of user-defined criteria, a plurality of components within the inventory of components that satisfy the set of user-defined criteria;
responsive to receiving a user selection of a first component and a second component from the plurality of components of the inventory of components, inputting into a machine learning model, first component data associated with the first component and second component data associated with the second component to obtain an indication whether the first component and the second component are interchangeable, wherein the first component data comprises a first description of the first component and one or more first images associated with the first component and the second component data comprises a second description of the second component and one or more second images associated with the second component, and wherein the machine learning model is trained to determine whether two components are interchangeable;
responsive to obtaining the indication that the first component and the second component are interchangeable, generating a resource token indicating temporary transfer, to a user, of the first component and the second component from the corresponding primary custodian associated with each component, wherein the resource token comprises (1) the user identification data, (2) a first entry corresponding to a first identifier of the first component, (3) a second entry corresponding to a second identifier of the second component, and (4) a time limit representing a time after which the temporary transfer becomes a permanent transfer, and
transmitting an indication of the resource token to the remote device.

2. A method comprising:
receiving, from a remote device, a request for components that match a set of user-defined criteria, wherein the request comprises the set of user-defined criteria;
determining, within an inventory of components and based on the set of user-defined criteria, a plurality of components that satisfy the set of user-defined criteria, wherein the inventory of components comprises a list of components and metadata identifying a corresponding set of specifications for each component;
responsive to receiving a user selection of a first component and a second component from the plurality of components of the inventory of components, inputting into a machine learning model, first component data associated with the first component and second component data associated with the second component to obtain an indication whether the first component and the second component are interchangeable, wherein the machine learning model is trained to determine whether two components are interchangeable;
responsive to obtaining the indication that the first component and the second component are interchangeable, generating a resource token indicating temporary transfer of the first component and the second component to a user, wherein the resource token comprises (1) user identification data of a user, (2) a first entry corresponding to a first identifier of the first component, (3) a second entry corresponding to a second identifier of the second component, and (4) a time limit representing a time after which the temporary transfer becomes a permanent transfer, and transmitting an indication of the resource token to the remote device.

3. The method of claim 2, wherein the first component data comprises a first description of the first component and one or more first images associated with the first component and the second component data comprises a second description of the second component and one or more second images associated with the second component.

4. The method of claim 3, further comprising:
receiving, from a first primary custodian associated with the first component, (1) the first description of the first component and (2) one or more first images associated with the first component;
receiving, from a second primary custodian associated with the first component, (1) the second description of the second component and (2) one or more second images associated with the second component; and
determining, based on a component type of the first component and second component, a value for the time limit.

5. The method of claim 2, wherein each component is associated with a corresponding primary custodian and generating the resource token comprises indicating the temporary transfer of the first component and the second component from the corresponding primary custodian.

6. The method of claim 5, further comprising:
receiving, from the remote device, an indication that either the first component or the second component has been transferred from the user to the corresponding primary custodian; and
responsive to receiving the indication, deactivating the resource token.

7. The method of claim 6, wherein the resource token further comprises a flag representing visibility of the resource token by the remote device, and wherein deactivating the resource token comprises modifying a value of the flag.

8. The method of claim 2, further comprising:
responsive to a determination that the time limit is exceeded, generating a first component resource token and a second component resource token, wherein the first component resource token comprises user identification data and the first identifier of the first component, and wherein the second component resource token comprises the user identification data and the second identifier of the second component; and
transmitting, to the remote device a notification comprising (1) an indication that the time limit is exceeded and (2) an indication of successful generation of the first component resource token and the second component resource token.

9. The method of claim 2, further comprising:
receiving, from the remote device, an input indicating that the first component and the second component are not interchangeable;
training the machine learning model using (1) the input, (2) the first component data associated with the first component and (3) the second component data associated with the second component to obtain an updated machine learning model; and storing one or more model parameters of the updated machine learning model.

10. The method of claim 2, further comprising:
accessing, from a remote server, data including a plurality of entries each associated with a corresponding component;
transforming the plurality of entries into a standardized dataset, wherein each entry of the standardized dataset is associated with a corresponding component and comprises (1) a corresponding textual description, (2) one or more corresponding images, and (3) one or more identifiers identifying interchangeable components; and
training the machine learning model using the standardized dataset to obtain one or more model parameter values for the machine learning model.

11. The method of claim 2, further comprising:
accessing, from a remote server, a plurality of datasets each comprising data specific to a corresponding component type; and
training each of a plurality of machine learning models using a dataset specific to a corresponding component type, wherein each machine learning model is trained to determine whether two components of a component type are interchangeable to obtain one or more model parameter values for the machine learning model.

12. The method of claim 2, further comprising:
determining a component type from a plurality of component types based on the user selection of the first component and the second component;
selecting, using the component type, the machine learning model from a plurality of machine learning models, wherein the machine learning model is trained to determine whether two components of the component type are interchangeable; and
accessing, from a remote server, one or more model parameter values corresponding to the machine learning model.

13. One or more non-transitory, computer-readable media comprising instructions recorded thereon that, when executed by one or more processors, causes operations for temporarily allocating components via resource tokens, comprising:
receiving, from a remote device, a request for components that match a set of user-defined criteria from an inventory of components, wherein the request comprises the set of user-defined criteria;
determining, based on the set of user-defined criteria, a plurality of components from the inventory of components that satisfy the set of user-defined criteria, wherein the inventory of components comprises a list of components and metadata identifying a corresponding set of specifications for each component;
responsive to receiving a user selection of a first component and a second component from the plurality of components of the inventory of components, inputting into a machine learning model, first component data associated with the first component and second component data associated with the second component to obtain an indication whether the first component and the second component are interchangeable, wherein the machine learning model is trained to determine whether two components are interchangeable;
responsive to obtaining the indication that the first component and the second component are interchangeable, generating a resource token indicating temporary transfer of the first component and the second component to a user, wherein the resource token comprises (1) user identification data of a user, (2) a first entry corresponding to a first identifier of the first component, (3) a second entry corresponding to a second identifier of the second component, and (4) a time limit representing a time after which the temporary transfer becomes a permanent transfer, and transmitting an indication of the resource token to the remote device.

14. The one or more non-transitory, computer-readable media of claim 13, wherein the first component data comprises a first description of the first component and one or more first images associated with the first component and the second component data comprises a second description of the second component and one or more second images associated with the second component.

15. The one or more non-transitory, computer-readable media of claim 14, wherein the instructions further cause operations comprising:

receiving, from a first primary custodian associated with the first component, (1) the first description of the first component and (2) one or more first images associated with the first component;

receiving, from a second primary custodian associated with the second component, (1) the second description of the second component and (2) one or more second images associated with the second component; and determining, based on a component type of the first component and the second component, a value for the time limit.

16. The one or more non-transitory, computer-readable media of claim 13, wherein each component is associated with a corresponding primary custodian and generating the resource token comprises indicating the temporary transfer of the first component and the second component from the corresponding primary custodian.

17. The one or more non-transitory, computer-readable media of claim 16, wherein the instructions further cause operations comprising:

receiving, from the remote device, a notification that either the first component or the second component has been transferred from the user to the corresponding primary custodian; and responsive to receiving the notification, deactivating the resource token.

18. The one or more non-transitory, computer-readable media of claim 17, wherein the resource token further comprises a flag representing visibility of the resource token by the remote device, and wherein deactivating the resource token comprises modifying a value of the flag.

19. The one or more non-transitory, computer-readable media of claim 13, wherein the instructions further cause operations comprising:

responsive to a determination that the time limit is exceeded, generating a first component resource token and a second component resource token, wherein the first component resource token comprises the user identification data and the first identifier of the first component, and wherein the second component resource token comprises the user identification data and the second identifier of the second component; and transmitting, to the remote device a notification comprising (1) a first indication that the time limit is exceeded and (2) a second indication of successful generation of the first component resource token and the second component resource token.

20. The one or more non-transitory, computer-readable media of claim 13, wherein the instructions further cause operation comprising:

determining a component type from a plurality of component types based on the user selection of the first component and the second component;

selecting, using the component type, the machine learning model from a plurality of machine learning models, wherein the machine learning model is trained to determine whether two components of the component type are interchangeable; and accessing, from a remote server, one or more model parameter values corresponding to the machine learning model.

* * * * *